(No Model.)
T. W. BALL.
TOASTER.
No. 359,417. Patented Mar. 15, 1887.
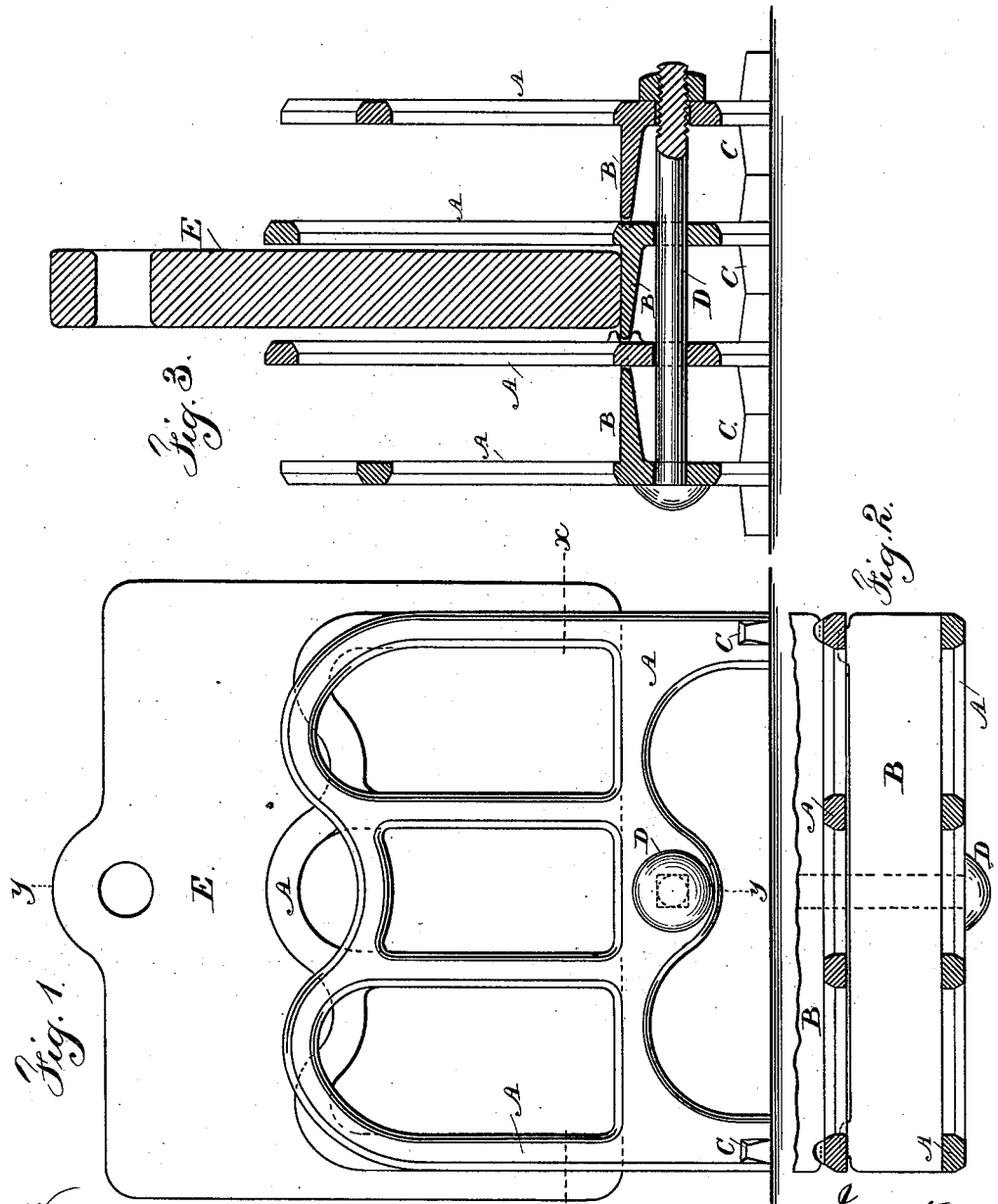
Witnesses
Chas. H. Smith
Geo. T. Pinckney
Inventor
Thomas W. Ball
per Lemuel W. Serrell
atty

UNITED STATES PATENT OFFICE.

THOMAS W. BALL, OF JERSEY CITY, NEW JERSEY.

TOASTER.

SPECIFICATION forming part of Letters Patent No. 359,417, dated March 15, 1887.

Application filed November 11, 1886. Serial No. 218,546. (No model.)

*To all whom it may concern:*

Be it known that I, THOMAS W. BALL, of Jersey City, in the county of Hudson and State of New Jersey, have invented an Improvement in Toasters, of which the following is a specification.

This device is designed for holding a red-hot plate of iron and bread or other materials at the opposite sides of the same, so as to toast bread or broil meat or other material held in the holder.

In the drawings, Figure 1 is an elevation of the holder as in use. Fig. 2 is a sectional plan view of the same at the line $x\ x$ of Fig. 1; and Fig. 3 is a section at the line $y\ y$, Fig. 1.

The vertical frames A A are of open-work wire or other suitable material. I have shown them as cast metal, with the intermediate ledges, B, which serve to keep the frames at the proper distances apart, and the foot-pieces C support the frames and ledges, and the bolt D, passing through the lower parts of the frames, tie the parts firmly together.

A plate of iron, E, is provided with an eye or loop, by which it can be lifted by a poker or hook from the fire when it is sufficiently heated and placed upon the stand or ledge B between two of the frames A, so as to be held by such frames, and bread or other material to be toasted is supported between the adjacent frames and exposed to the heated surface of the iron, so as to toast the same, and such bread or other materials are turned to present the other surfaces to the heat of the iron. It is preferable to employ four frames with three intervening spaces, as shown, so that the heated iron may be introduced into the middle space and bread or other material be inserted into the two side spaces, so as to use both sides of the heated iron simultaneously.

I do not claim a wire or metallic stand for holding toast, as these are well known. By my improvement the heated plate is easily moved and held up vertically when in place, so that both sides are simultaneously used, and the stand is adapted to such plate and to the article to be toasted or cooked.

I claim as my invention—

The combination, with a metal plate to be heated and having a hole for a poker or lifter, of a metallic stand having ledges and uprights, frames for holding up such heated plate vertically, and frames for holding up bread or other material to be toasted at each side of the heated plate, substantially as set forth.

Signed by me this 3d day of November, 1886.

THOS. W. BALL.

Witnesses:
JOHN BROWN,
F. S. BROWN.